Feb. 23, 1926.
A. C. HOECKER
1,573,833
COMBINED CONTRACTOR AND EXPANDER FOR AUTOMOBILE TIRE RIMS
Filed June 6, 1921
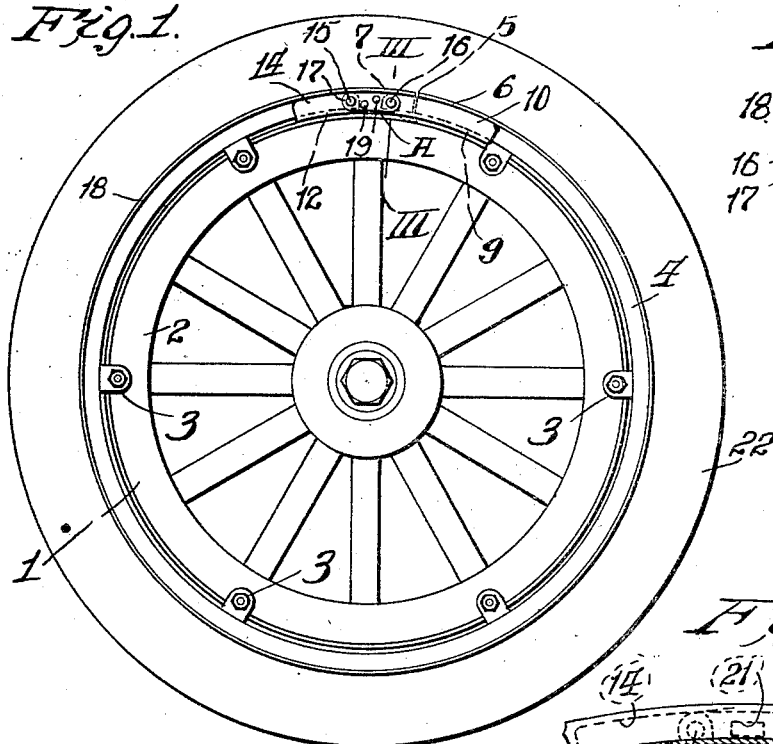
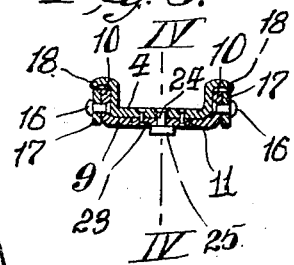
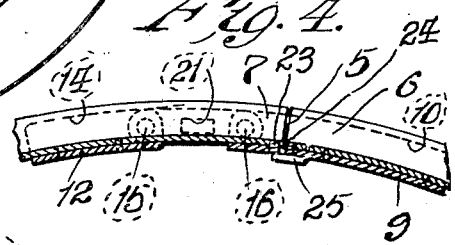
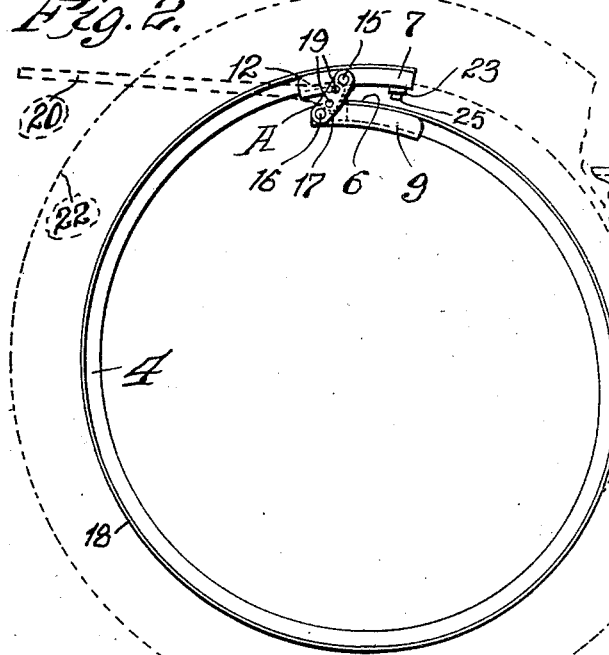
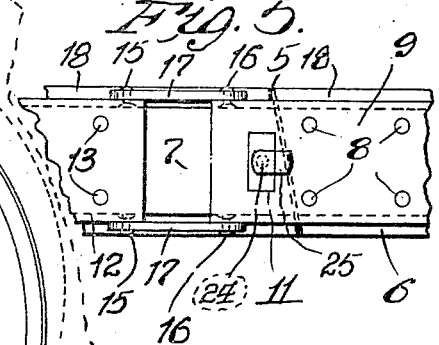
Inventor:
Albert C. Hoecker.
By L. G. Fletcher
atty.

Patented Feb. 23, 1926.

1,573,833

UNITED STATES PATENT OFFICE.

ALBERT C. HOECKER, OF COLLINSVILLE, ILLINOIS.

COMBINED CONTRACTOR AND EXPANDER FOR AUTOMOBILE TIRE RIMS.

Application filed June 6, 1921. Serial No. 475,504.

*To all whom it may concern:*

Be it known that I, ALBERT C. HOECKER, a citizen of the United States of America, and a resident of the city of Collinsville, county of Madison, and State of Illinois, have invented new and useful Improvements in a Combined Contractor and Expander for Automobile Tire Rims, of which the following is a specification.

The primary object of this invention is to provide an improved attachment to be used on each side of the ends of a transplit tire rim so that an operating tool can be engaged on either side of the attachment for contracting or expanding a tire rim.

Another object of the invention is to provide improved locking means to an attachment of this improved character.

A further object of the invention is to provide an improved contracting and expanding attachment to automobile tire rims so that the heretofore lateral twisting strain attendant with the contracting and expanding of a transplit tire rim is eliminated.

Other and further objects will appear in the specification and be specifically pointed out in the appended claim, reference being had to the accompanying drawings exemplifying the invention, and in which:

Fig. 1 is a side elevation of an automobile wheel showing this improved attachment applied to the tire carrying rim thereof.

Fig. 2 is a side elevation of the rim showing it in a contracted position.

Fig. 3 is an enlarged transverse section taken on the line III—III of Fig. 1.

Fig. 4 is an enlarged longitudinal section taken approximately on the line IV—IV of Fig. 3.

Fig. 5 is an inverted view of Fig. 4.

With reference to the accompanying drawings, 1 designates an automobile wheel provided with the usual felloe 2, to which the ordinary tire rim securing lugs 3 are fastened, and held on the felloe by said lugs is the tire rim 4 which is provided with the transplit 5 thereby providing respective rim ends 6 and 7, and secured to the inner periphery of the rim end 6 by riveting such as 8 is a channel shaped member 9 provided with opposing side portions 10, the member 9 being provided with a rectangular opening 11.

Secured to the inner periphery of the rim end 7 is a channel shaped member 12, which is secured thereto by the riveting 13, said member 12 having opposing side portions 14, and secured to adjacent side portions 10 and 14 by respective pivots 15 and 16 is a link 17, each of said links being secured outside of the members 9 and 12.

It is to be noted from an inspection of Fig. 3 that the rim 4 is provided with the usual outwardly extending lips 18, each of said lips amply overlapping a link 17, said lips protecting the links from obstacles of the road during travel of the vehicle.

As a further designation to the pair of links 17, which are oppositely disposed from one another, each link will be respectively hereinafter referred to as A and B, the link A intermediate of its pivots 15 and 16 being provided with a pair of openings 19 for the introduction of the pins of a spanner wrench or tool 20, while the link B is provided with a polygonal opening 21 for the reception of a co-operable tool, said pair of openings 19 of the link A and the polygonal opening 21 of the link B merely being shown differently so that it can readily be seen that any form or type of wrench engaging relation can be provided.

In the operation of this improved attachment, in the event it is required to move the tire 22, the lugs 3 are dismounted from engagement with the rim 4 and the rim 4 bearing the tire is removed from the wheel felloe, then the tool 20 is engaged so that the pair of pins thereof are respectively mounted in the openings 19 of the link A, and the handle of the tool is forced downwardly thereby causing said link to fulcrum on the pivot 15, and as said link is forced past a dead center provided by the pair of pivots 15 and 16 relatives to the ends 6 and 7 of the rim 4 the resiliency of said ends will throw both of the links A and B over the dead center to a locked position, as shown in Fig. 2, thereby underlapping the end 6 relative to the end 7 such lapping relation of said rim ends contracting the rim 4 so that the tire 22 can readily be moved from the rim.

After said tire has been placed on the rim in its contracted position, the tool 20 is then engaged to the link A and the swinging operation of the link A is reversed thereby expanding the rim to the position shown in Fig. 1. In this expanding and contracting operation, it is to be noted that on account of there being a pair of links borne by the rim ends, said rim ends will be held in alinement in which they cannot be sprung laterally from one another.

For providing a lock to the rim ends 6 and 7 so that they will be held in expanded positions towards one another, a lug 23 is secured to the inner periphery of the rim end 7 and turnable on said lug by a pin 24 is a member 25, said lug and member adapted to be engaged through the opening 11 provided in the channel member 9 when the rim 4 is expanded, and after the member 25 has been engaged through said opening and before the rim bearing the tire has been mounted on the wheel felloe, said member is turned crosswise of the opening 11 so that a portion thereof will be engaged against the underside of the channel member 9.

It is obvious that in the demounting of the rim relative to the tire, the member 25 is turned to a position so that it can be moved from the opening 11 of the member 9 when the rim is contracted.

What I claim is:

A tire rim transplit so as to provide ends thereto, a channel member underlapping each of said rim ends and secured thereto, one of said members overlapping the transplit of the rim, linkage secured to the adjacent side portions of each of said members, and means provided on the linkage for cooperable engagement with an operating tool.

ALBERT C. HOECKER.